C. S. WRIGHT.
UNIVERSAL PULL ROD CLAMP.
APPLICATION FILED JULY 30, 1913.
1,106,856. Patented Aug. 11, 1914.
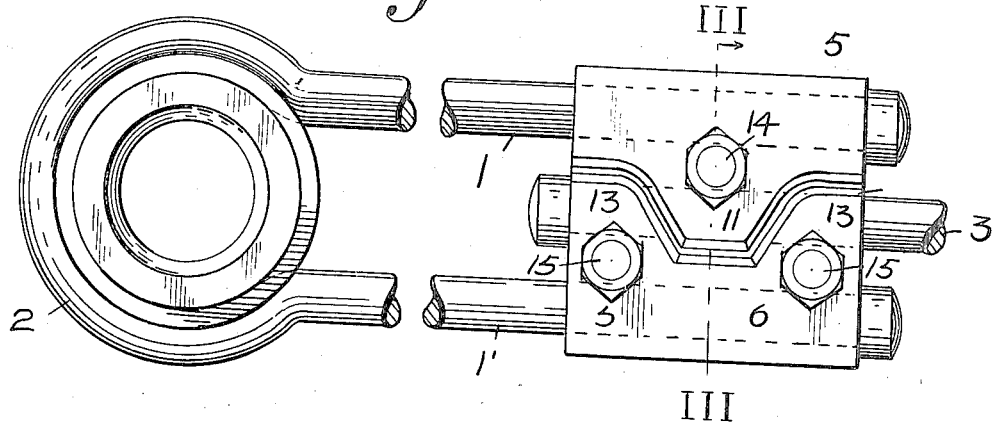
Fig. 1.
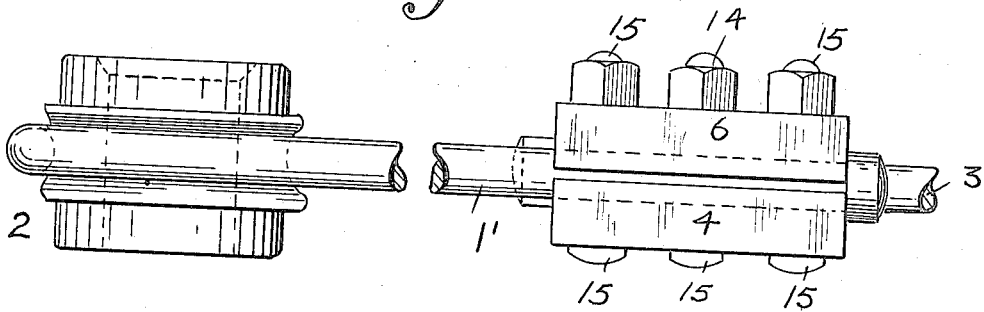
Fig. 2.
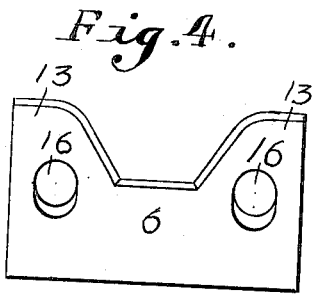
Fig. 4.
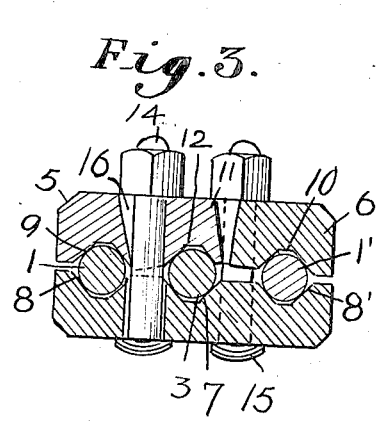
Fig. 3.
Fig. 5.
WITNESSES
INVENTOR
C. S. Wright
by F. N. Barber
attorney

UNITED STATES PATENT OFFICE.

CLYDE S. WRIGHT, OF TOLEDO, OHIO, ASSIGNOR TO THE NATIONAL SUPPLY COMPANY, OF TOLEDO, OHIO, A CORPORATION OF OHIO.

UNIVERSAL PULL-ROD CLAMP.

1,106,856.  Specification of Letters Patent. Patented Aug. 11, 1914.

Application filed July 30, 1913. Serial No. 782,128.

*To all whom it may concern:*

Be it known that I, CLYDE S. WRIGHT, a citizen of the United States, residing at Toledo, in the county of Lucas and State of Ohio, have invented new and useful Improvements in Universal Pull-Rod Clamps, of which the following is a specification.

My invention relates to clamps for pull-rod power connections and is particularly adapted to secure the end of a pull-rod between the ends of a clevis whether the rod and the ends of the clevis are of the same diameter or of different diameters.

Referring to the accompanying drawings, Figure 1 is a side elevation of a rod and a clevis secured together by my improved clamp; Fig. 2, an edge view of Fig. 1; Fig. 3, a section on the line III—III, Fig. 1; Fig. 4, a plan of the member 6; and Fig. 5, an end view of the member 6 with the rods 1' and 3 in section.

On the drawings, 1, 1' represent two rods or the ends of the clevis 2, and 3, a rod with one end between the ends of the clevis.

The clamp consists of the member 4 and the two narrower members 5 and 6, which lie on the opposite side of the rod 3 and the clevis ends from the member 4. The member 4 has a width greater than the distance between the clevis ends and is provided with the central groove 7 for the rod 3 and the two grooves 8, 8', one on each side of the groove 7, for the clevis ends. The member 5 has the groove 9 opposite the groove 8 and the member 6 has the groove 10 opposite the groove 8'. The member 5 has a central tongue or projection 11 which has the groove 12 opposite the groove 7. The member 6 has the two tongues or projections 13 one on each side of the tongue 11, the tongue 13 having grooves 13' (only one shown, Fig. 5) opposite the groove 7, and over the rod 3.

The clamping bolt 14 is passed through the members 4 and 5 to clamp the clevis end 1 and the rod 3 between the said members and the clamping bolts 15 clamp the clevis end 1' and the rod 3 between the members 4 and 6. As the member 5 and the member 6 both rest upon the central rod 3, as the member 5 rests on the rod or clevis end 1 and not on the rod or clevis end 1', and as the member 6 rests on the rod or clevis end 1' and not on the rod or clevis end 1, the three rods can be tightly and perfectly clamped, no matter whether the rods have the same or different diameters. In order that the members 5 and 6 may tilt, one with respect to the other and to the member 4, the bolt holes 16 in the member are slightly elongated transversely of their length, as shown in Figs. 3, 4, and 5.

From Figs. 3 and 5, it will be seen that inner faces of the members 5 and 6, that is, the faces adjacent to the member 4, are inclined from the rods 1 and 1' toward and beyond the rod 3 and away from the member 4. If the rod 3 were smaller than the rods 1 and 1', the adjacent ends of the members 5 and 6 would tilt toward the member 4 so that the said inclined faces would become more nearly parallel with the member 4. The said inclined faces, or the wedge-shaped space between each member 5 and 6 and the member 4, permits an adjustment of the members 5 and 6 to make them grip a central rod 3 smaller than the lateral rods 1 and 1'. It is obvious also that the clamping members are adapted to grip the rods firmly when the outer rods 1 and 1' are smaller than the central rod 3. The clamp is, therefore, universal in that it will firmly and uniformly grip three rods, one being between the other two, no matter whether the rods have the same diameter, or two have one diameter and the other a different diameter, or all have different diameters.

I have beveled or inclined the adjacent edges of the members 5 and 6 toward each other and the member 4, that is, the outer faces of the members 5 and 6 are narrower than their inner faces, so that when the adjacent edges tilt toward the member 4 to grip a rod 3 which is smaller than the rods 1 and 1', the said edges will not engage each other and prevent perfect clamping action on the central rod.

I claim—

1. In a clamp for three rods, one being between the other two, a clamping member adapted to engage all three rods, two clamping members each narrower than, and opposite to, the first-named member, each of the two narrower members adapted to engage the center rod and only one of the other two rods, and means for drawing the said narrower members toward the wider member.

2. In a clamp for three rods, one being between the other two, a clamping member having grooves to receive all three rods, and two clamping members opposite the first clamping member, one of the two clamping members having a groove to receive one of the outer rods and the other of the two clamping members having a groove to receive the other outer rod, and each of the said two clamping members having a projection provided with a groove to receive the intermediate rod.

3. In a clamp for three rods, one being between the other two, a clamping member adapted to engage all three rods, two clamping members each narrower than, and opposite to the first-named member, each of the two narrower members adapted to engage the center rod and only one of the other two rods, and means for drawing the said narrower members toward the wider member, the under faces of the narrower members being inclined with respect to the adjacent face of the wider member to permit the tilting of the narrower members without engaging the wider member.

4. In a clamp for three rods, one being between the other two, a clamping member adapted to engage all three rods, two clamping members each narrower than, and opposite to, the first-named member, each of the two narrower members adapted to engage the center rod and only one of the other two rods, and means for drawing the said narrower members toward the wider member, the inclined outer faces of the narrower members being narrower than their inner faces.

Signed at Toledo, Ohio, this 24th day of July, A. D. 1913.

CLYDE S. WRIGHT.

Witnesses:
R. F. HILL,
M. N. TABER.